Figure 2:
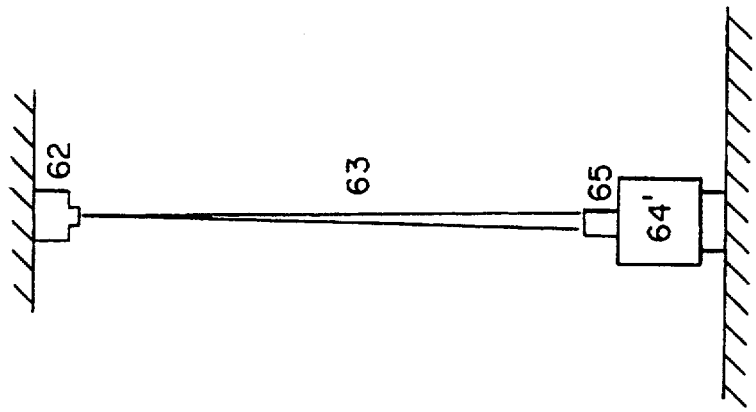

United States Patent [19]
Calabrese

[11] Patent Number: 5,429,203
[45] Date of Patent: Jul. 4, 1995

[54] LINEAR ENERGY CONCENTRATOR

[76] Inventor: Frank A. Calabrese, 13294 Old Mill Rd., Waynesboro, Pa. 17268

[21] Appl. No.: 869,545

[22] Filed: Apr. 16, 1992

Related U.S. Application Data

[63] Continuation of Ser. No. 94,075, Sep. 4, 1987, Pat. No. 5,113,962, which is a continuation of Ser. No. 820,644, Jan. 27, 1986, abandoned.

[51] Int. Cl.$^6$ .............................................. G05D 1/00
[52] U.S. Cl. .................................... 180/167; 318/587; 364/424.02
[58] Field of Search ....................... 180/167, 168, 169; 318/587; 364/424.02; 343/356

[56] References Cited

U.S. PATENT DOCUMENTS

| | | | |
|---|---|---|---|
| 3,964,824 | 6/1976 | Dixon | 350/433 |
| 4,184,748 | 1/1980 | Kugler | 350/433 |
| 4,488,233 | 12/1984 | Tsumura | 180/167 |
| 5,113,962 | 5/1992 | Callabrose | 180/167 |

Primary Examiner—David M. Mitchell
Attorney, Agent, or Firm—Spencer T. Smith

[57] ABSTRACT

A linear energy communication system which allows a stationary device to communicate with a device moving along a predefined path through the use of radiated energy. An electronic signal generated by a transmitter is converted into energy in the opto-electromagnetic frequency spectrum by means of an appropriate transducer. The energy is then focused into a line. A receiving device moving along the path of the line receives the linear energy and converts the received energy back into the original electronic signal. The system will allow for the communication and guidance of a remote moving vehicle along a predefined path without the encumbrance of wires, buss bars or broad band communications.

2 Claims, 6 Drawing Sheets

LINEAR ENERGY CONCENTRATOR

This is a continuation of application Ser. No. 07/094,075 now U.S. Pat. No. 5,113,962 filed on Sep. 4, 1987 which is a continuation of Ser. No. 820,644 filed on Jan. 27, 1986 now abandoned.

A linear energy concentrator is disclosed which is a static electronic energy conversion device consisting of two parts, a receiver and a transmitter. Being static, it contains no moving parts. An electronic signal is converted into an energy signal and is transmitted in the form of a line. The linear energy signal may be viewed as a plane of energy which is transmitted along a linear path. The width, length, and even the curvature of the energy line may be adjusted to meet specific applications. The energy transmitted in this fashion may be received by a receiver located anywhere along the aforementioned line (path). Encoded, superimposed or integrated within the energy line is a communication signal, which may be pulses (a train of signals varying in width, frequency, amplitude and shape), discrete (absence or presence of energy), or analog (a frequency different from that of the energy line by which the energy may be modulated in amplitude or frequency). The complimentary receiver located anywhere along the line (path) of the transmitted energy will receive the energy, and decode the communication signal. In this fashion, communication will occur between transmitter(s) and receiver(s) located along the energy path. Both or either transmitting and receiving parts may be fixed or moving with respect to each other during the communication.

Other objects and advantages of the present invention will become apparent from the following portion of the specification and from the following drawings which illustrate in accordance with the mandate of the patent statutes a presently preferred embodiment incorporating the principles of the invention.

Figure 1:
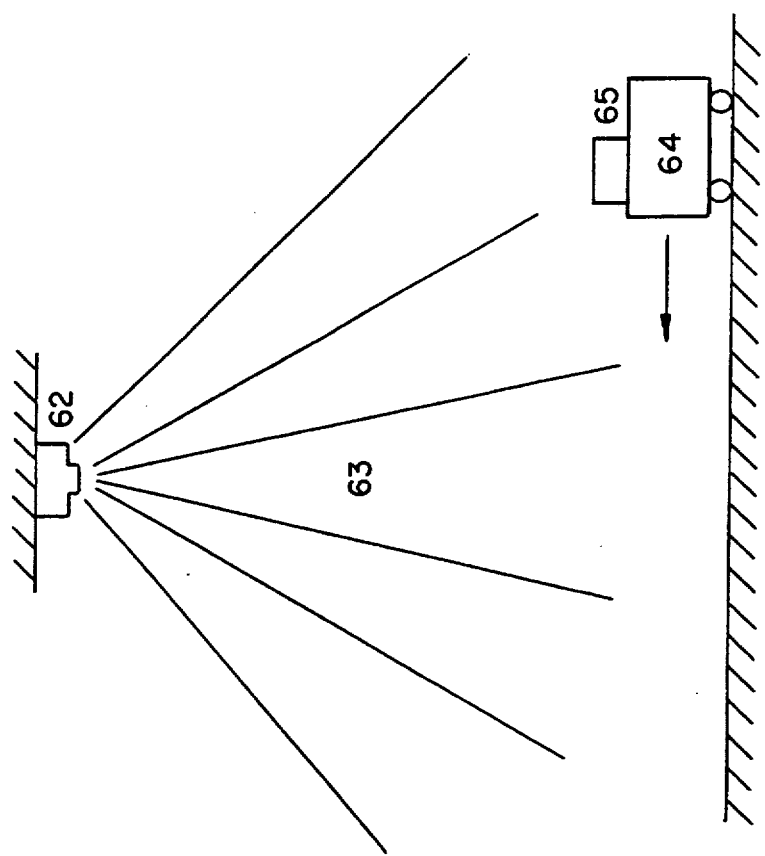
Figure 3:
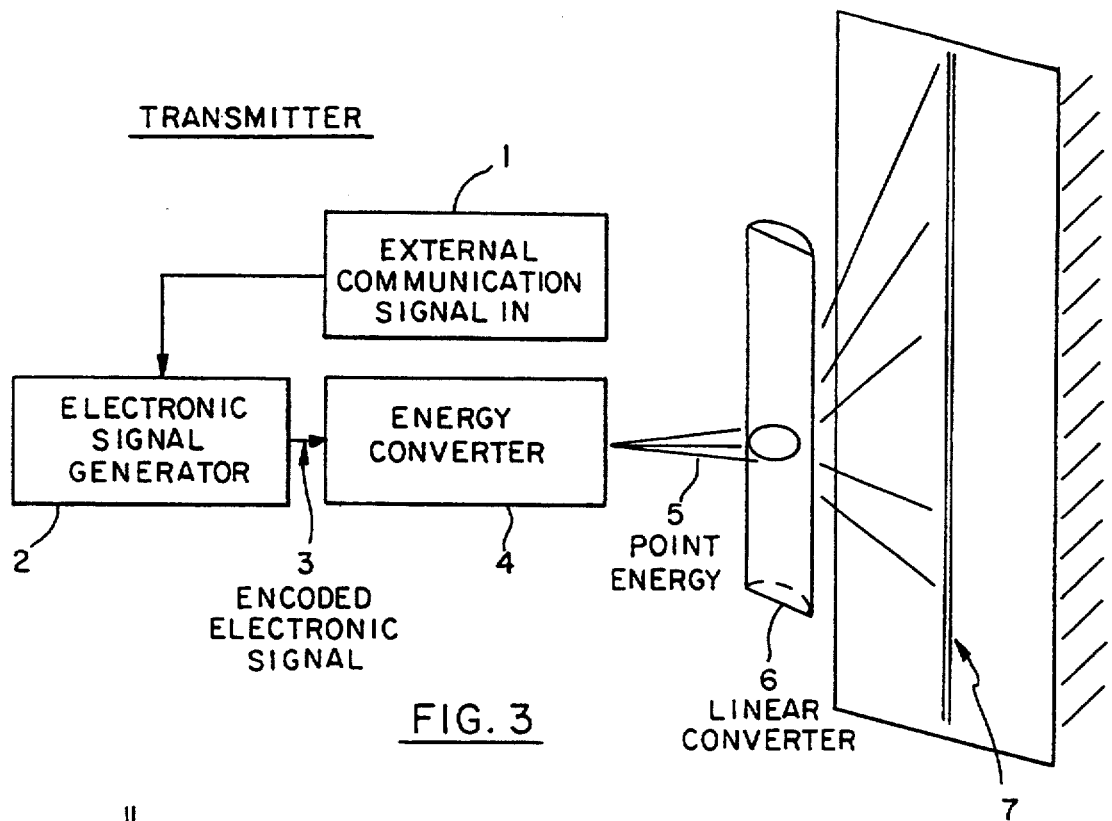
Figure 4:
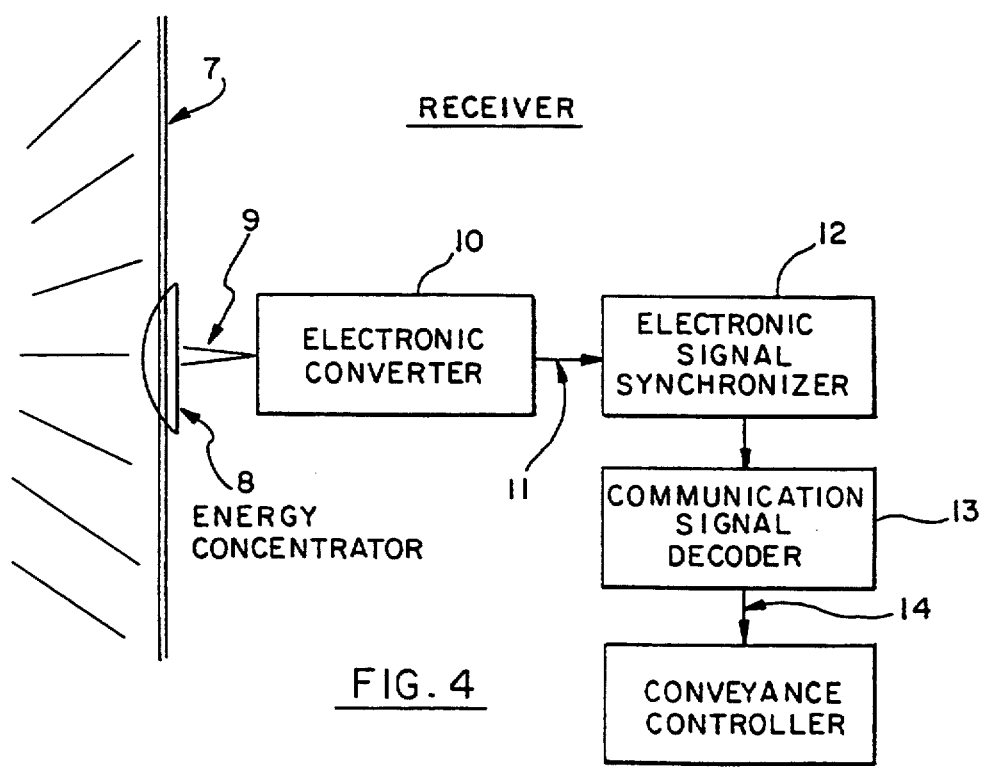
Figure 5:
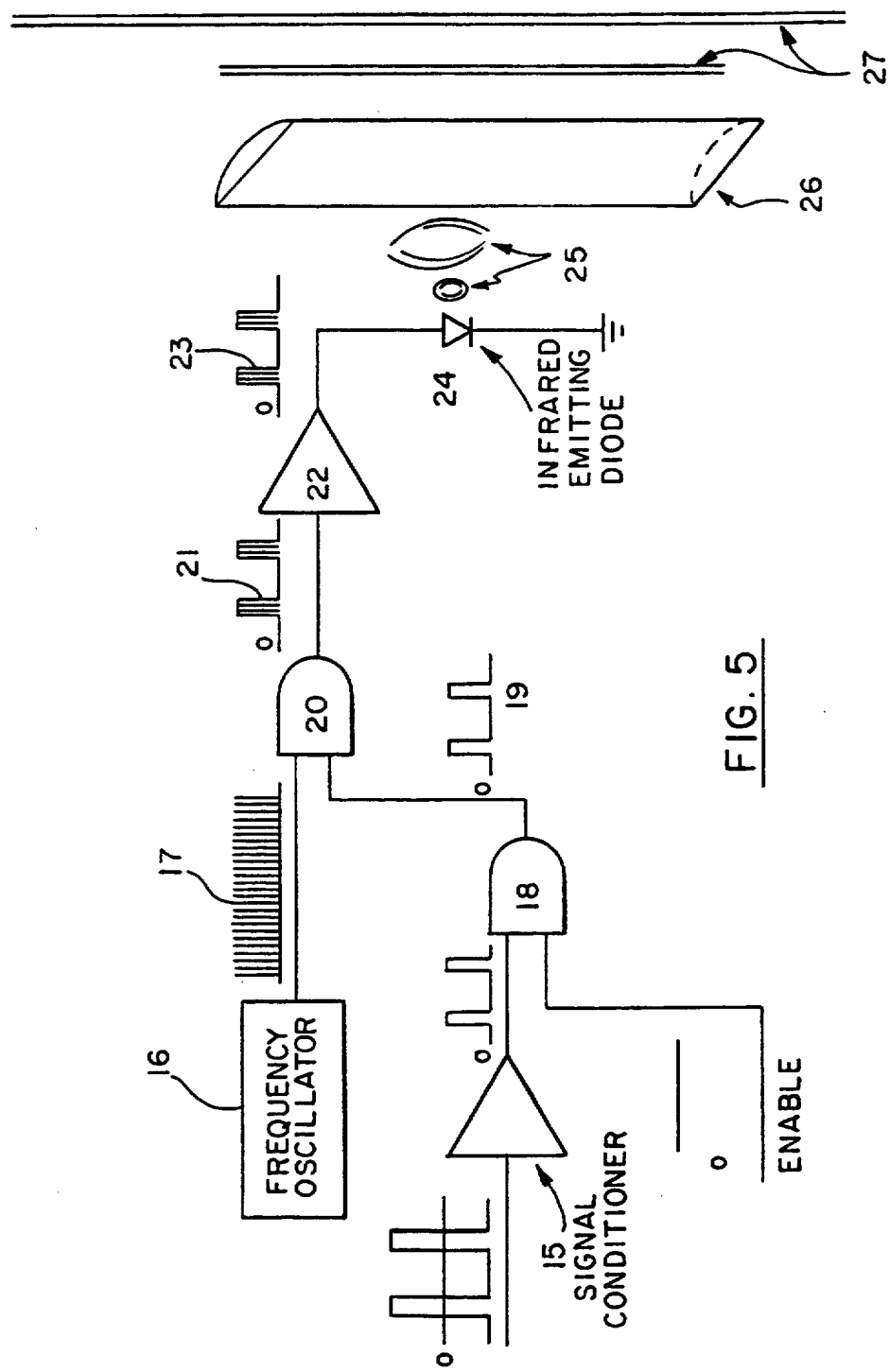
Figure 6:
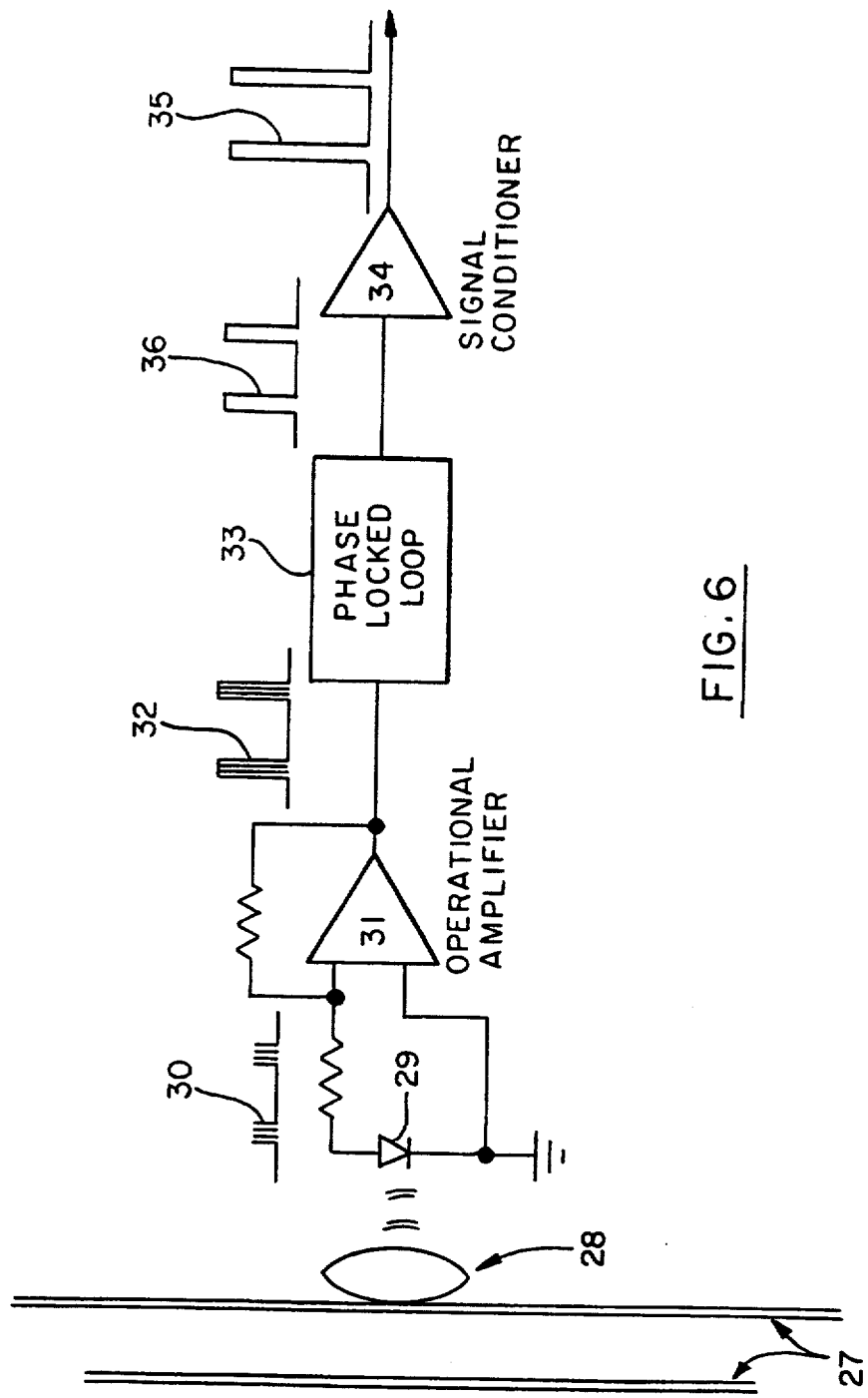
Figure 7:
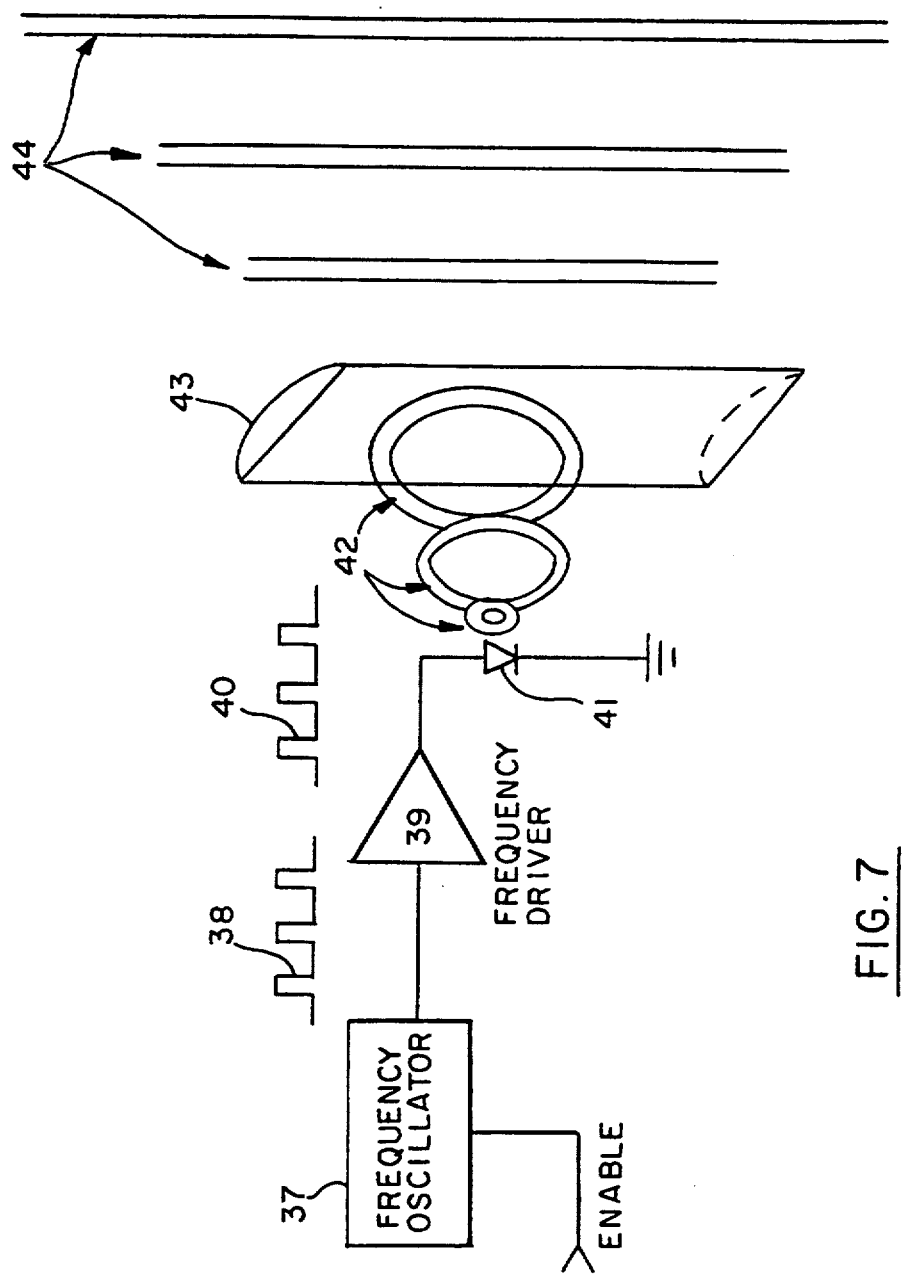
Figure 8:
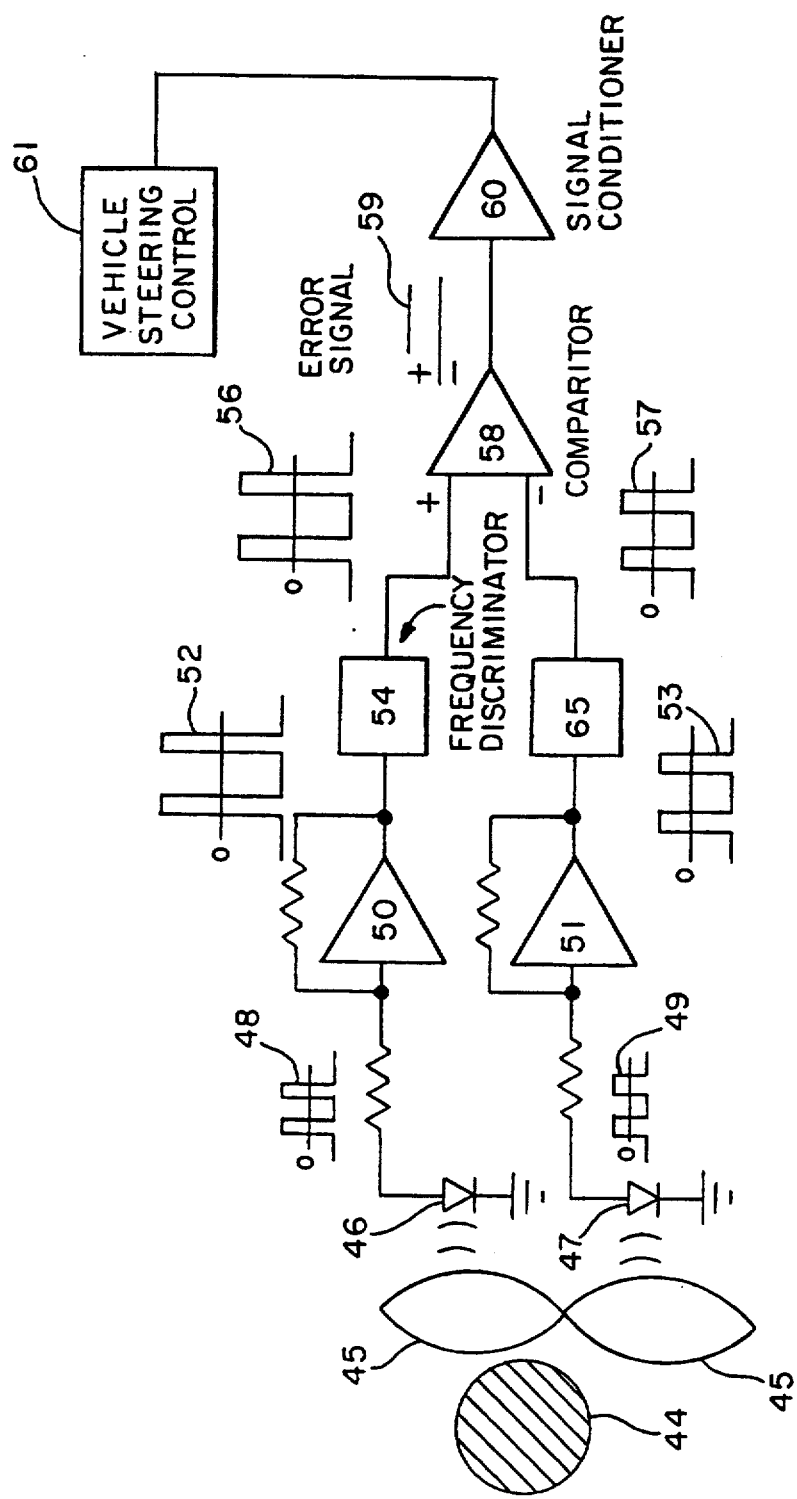

Referring to the drawings:

FIG. 1 is a side view of a light energy concentrator made in accordance with the teachings of the present invention, FIG. 2 is a front view of the light energy concentrator shown in FIG. 1, FIG. 3 is a block diagram illustrating the transmitter of the light energy concentrator, FIG. 4 is a block diagram illustrating the receiver of the light energy concentrator, FIG. 5 is a block diagram of a transmitter for transmitting infrared optical energy, FIG. 6 is a block diagram of a receiver for receiving infrared optical energy, FIG. 7 is a block diagram illustrating a transmitter transmitting discrete signals; and FIG. 8 is a block diagram illustrating a receiver for receiving the discrete signals transmitted by the transmitter illustrated in FIG. 7.

An application example would consist of a stationary transmitter 62 as shown in FIGS. 1 and 2. The transmitter 62 is sending a linear beam of energy 63 encoded with a message along the path of a moving receiver 65 attached to a conveyance 64, such as an automated guided vehicle, which receives and converts the linear energy back into an electronic signal decoded to present pure ASCII communication information. The beam 63 extends along a portion of the pathway. The conveyance will be in continual communication with a stationary device so long as the conveyance is in the path of the transmitted linear beam. The communication occurs with no physical connection or wiring between the stationary device 62 and the moving conveyance 64.

Referring to FIG. 3, the external communication signal 1 contains the information (data) which is to be transmitted by the transmitter 62. This information is provided by an external source. This external signal is integrated with the Electronic Signal Generator 2 which results in an electronic encoded signal 3. This electronic encoded signal drives the Energy Converter 4, which generates a point source of encoded energy 5; this encoded energy immediately begins to disperse omnidirectionally from its point source. It now is intercepted by the Linear Converter 6 which focuses the rapidly dispersing energy into a narrow line of encoded energy which may be directed along a prescribed path 7. A receiving device 65 either moving or stationary within the path of the line of energy may now detect the encoded energy. This will only occur along the energy path. The receiving device includes an Energy Concentrator 8 which will focus the linear energy into a point source 9. The point source of energy is focused onto an Electronic Converter 10 which converts the energy into an encoded electronic signal 11. The Electronic Synchronizer 12 is tuned to the signal frequency generated by the Electronic Signal Generator 2. Upon recognizing the specified frequency, the communicated signal is decoded from the frequency by the Communication Signal Decoder 13 and is transmitted out to the hosing device as a decoded serial ASCII communication 14 to the Conveyance Controller.

The energy utilized can be anywhere within the electromagnetic spectrum which could include, but is not limited to, audio, visible light, laser, microwave, etc. Certain energy frequencies are better suited for individual applications. Infrared optical energy is very well suited for this environment. The infrared transmitting application is shown in FIG. 5.

The incoming data signal is conditioned through a Signal Conditioner 15, and allowed to pass through "and" gate 18 only when enabled by an external signal. The data signal 19 enables the higher frequency signal 17 which was generated by the Frequency Oscillator 16. Data pulses of encoded frequency 21 enter the current driver 22, which provides the encoded electrical signal of sufficient current to drive the infrared emitting diode 24. This provides sufficient current to generate the infrared energy pulses 25 corresponding to the encoded electrical signal. These infrared data pulses enter the cylindrical lens 26 which converts the omnidirectional energy pulses into linear energy pulses 27. The linear energy pulses are transmitted along the direction of a defined pathway. The infrared receiver shown in FIG. 6 may be either moving or stationary along the pathway and receives the linear energy pulses 27.

The lens 28 focuses the linear energy onto the infrared receiving diode 29. This then generates an electrical signal 30 of the encoded data. The encoded electrical signal is amplified by the operation amplifier 31 into a useable electrical signal 32 which enters the phase locked loop circuit, which is synchronized to the originally generated and transmitted frequency from the Frequency Oscillator 16. This circuit results in decoded pulses 36 which correspond to the original data from the Signal Generator 15. These decoded data pulses are conditioned by a Signal Conditioner 34 and the conditioned pulses are forwarded to a host.

The linear energy concentrator may be applied to guidance utilizing the aforementioned discrete or continuous signal transmission. The transmitter diagram in FIGS. 7 and 8 demonstrate this application. The Frequency Oscillator 37, when enabled, generates a constant frequency 38 which is input to a Frequency/Driver 39 for power amplification, which produces a high current signal 40, that energizes the infrared converter 41. Infrared energy pulses are generated 42, and focused onto a line of dimension 44. The receiver illustrated in FIG. 8 is traveling with a conveyance along the longitudinal direction of the energy line 44. Since the energy line 44 has dimension, two adjacent focusing lenses 45 are employed which straddle the line of energy 44. Each of the lenses 45 focuses a portion of the linear energy in proportion to its dimensional location across the width of the energy line. The energy of each lens is focused individually onto the associated infrared converter 46 and 47, thus each generating an electrical signal 48 and 49. These electrical signals will be identical in frequency, but proportionally different in amplitude. The difference in amplitude is directly proportional to the position of the receiver across the energy line. The two electrical signals 48 and 49 are amplified by associated operational amplifiers 50 and 51. The amplified signals 52 and 53 are passed through associated frequency discriminators 54 and 55. These frequency discriminators eliminate all undesirable signals which may have been received by the device. The two pure frequencies 56 and 57 then pass through a comparitor 58, which results in a single error signal 59 which is now directly proportional to deviation (error) of the receiver (or the conveyance to which it is attached) from the center of the energy line or path. The error signal passes through the signal conditioner 60, and the conditioned signal 61 is sent to the Vehicle Steering Mechanism for corrective action.

Most types of radiated energy can be utilized for this function; however, infrared energy offers a very safe and practical frequency range for this specific requirement. Electronic signals are generated which contain the data to be transmitted. These electronic signals are converted to infrared utilizing electronic devices manufactured for the purpose. The infrared energy generated begins to disperse until it contacts a cylindrical optical lens which linearizes the energy into a line. The shape and size of the line is established by design. This infrared energy line is optically focused onto a prescribed pathway, thus generating the linear energy only along the pathway. This focused linear energy pathway may be utilized to communicate or transmit guidance signals. Any receiving device along the pathway and aligned to the energy line only may receive the communication or guidance signals. This provides a new and unique method of communication and guidance for remote moving vehicles.

The invention claimed is:

1. An energy concentrator comprising
   transmitter means including
      means for generating a point source of encoded energy which will disperse omnidirectionally,
      lens means for intercepting said omnidirectionally dispersing encoded energy and for focusing the intercepted omnidirectional energy signal into a plane of encoded energy with the energy continuously present at all positions and all time through the plane and with the plane of encoded energy defining a selectively located extended line along a surface, and
   receiver means including
      a receiver proximate the surface for receiving the encoded energy of the plane and focusing the encoded energy into a point source
      means for converting the point source of energy focused by said receiver into an encoded electronic signal, and
      means for decoding the encoded electronic signal.

2. An energy concentrator according to claim 1, wherein said lens means focuses the intercepted omnidirectional energy signal into a plane which defines an extended straight line along the surface.

* * * * *